(12) United States Patent
Ferrant

(10) Patent No.: US 9,225,237 B2
(45) Date of Patent: Dec. 29, 2015

(54) CHARGE PUMP CIRCUIT COMPRISING MULTIPLE—GATE TRANSISTORS AND METHOD OF OPERATING THE SAME

(71) Applicant: Soitec, Crolles Cedex (FR)

(72) Inventor: Richard Ferrant, Esquibien (FR)

(73) Assignee: SOITEC, Bernin (FR)

( * ) Notice: Subject to any disclaimer, the term of this patent is extended or adjusted under 35 U.S.C. 154(b) by 0 days.

(21) Appl. No.: 14/384,129

(22) PCT Filed: Mar. 22, 2013

(86) PCT No.: PCT/EP2013/056126
§ 371 (c)(1),
(2) Date: Sep. 9, 2014

(87) PCT Pub. No.: WO2013/139976
PCT Pub. Date: Sep. 26, 2013

(65) Prior Publication Data
US 2015/0263610 A1    Sep. 17, 2015

(30) Foreign Application Priority Data

Mar. 23, 2012    (FR) ...................................... 1252640

(51) Int. Cl.
G05F 1/10        (2006.01)
G05F 3/02        (2006.01)
H02M 3/07       (2006.01)

(52) U.S. Cl.
CPC ........................................ *H02M 3/07* (2013.01)

(58) Field of Classification Search
CPC . H02M 3/073; H02M 3/07; H02M 2003/077; G11C 5/145; G11C 3/205

USPC ........................................................ 327/536
See application file for complete search history.

(56) References Cited

U.S. PATENT DOCUMENTS

| | | |
|---|---|---|
| 6,316,986 B1 | 11/2001 | Ferrant et al. |
| 6,518,818 B1 | 2/2003 | Hynes |
| 6,535,987 B1 | 3/2003 | Ferrant |
| 6,920,075 B2 | 7/2005 | Ferrant |
| 7,098,725 B2 | 8/2006 | Lee |
| 7,994,560 B2 | 8/2011 | Caillat et al. |

(Continued)

FOREIGN PATENT DOCUMENTS

WO    2009047715 A1    4/2009

OTHER PUBLICATIONS

International Search Report for International Application No. PCT/EP2013/056126 dated Jun. 23, 2013, 4 pages.

(Continued)

*Primary Examiner* — Quan Tra
(74) *Attorney, Agent, or Firm* — TraskBritt

(57) ABSTRACT

The invention relates to a charge pump circuit comprising an input node for inputting a voltage to be boosted; an output node for outputting a boosted voltage; a plurality of pumping stages connected in series between the input node and the output node, each pump stage comprising at least one charge transfer transistor, wherein the at least one charge transfer transistor is a double-gate transistor comprising a first gate for turning the transistor on or off according to a first control signal applied to the first gate and a second gate for modifying the threshold voltage of the transistor according to a second control signal applied to the second gate, wherein the first and second control signals have the same phase.

16 Claims, 14 Drawing Sheets

(56) References Cited

U.S. PATENT DOCUMENTS

| | | |
|---|---|---|
| 8,223,582 B2 | 7/2012 | Mazure et al. |
| 8,625,374 B2 | 1/2014 | Mazure et al. |
| 8,652,887 B2 | 2/2014 | Nguyen et al. |
| 8,654,602 B2 | 2/2014 | Mazure et al. |
| 2001/0055220 A1 | 12/2001 | Ferrant |
| 2003/0122611 A1* | 7/2003 | Min .............................. 327/536 |
| 2004/0036508 A1 | 2/2004 | Ferrant |
| 2009/0121269 A1 | 5/2009 | Caillat et al. |
| 2011/0241767 A1* | 10/2011 | Curatola et al. ............. 327/536 |
| 2012/0250444 A1 | 10/2012 | Mazure et al. |
| 2012/0275252 A1 | 11/2012 | Ferrant et al. |
| 2012/0275253 A1 | 11/2012 | Ferrant et al. |
| 2012/0275254 A1 | 11/2012 | Ferrant et al. |
| 2013/0100749 A1 | 4/2013 | Mazure et al. |

OTHER PUBLICATIONS

Marshall et al., Silicon on Insulator—The Perfect Material for Implantable Electronics?, Engineering in Medicine and Biology Workshop, USBN: 978-1-4244-1626-4, Nov. 11, 2007, pp. 118-121.

* cited by examiner

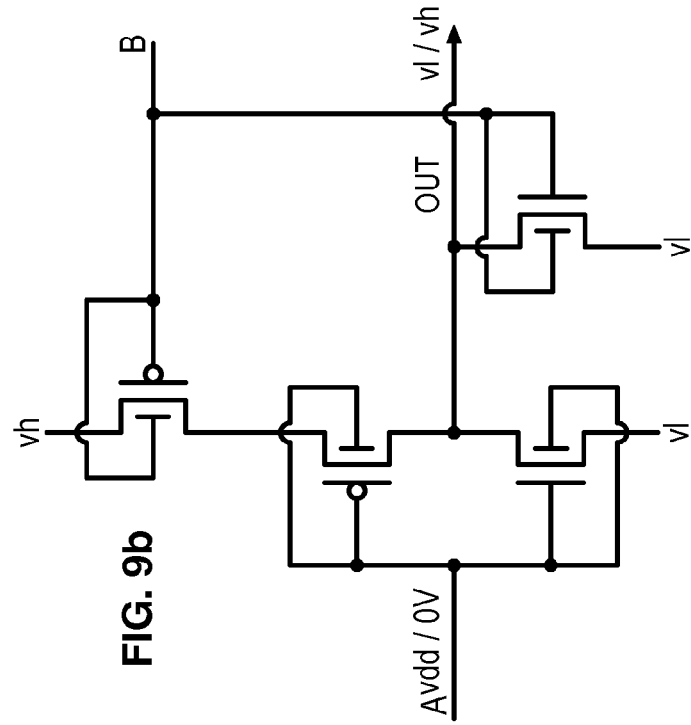
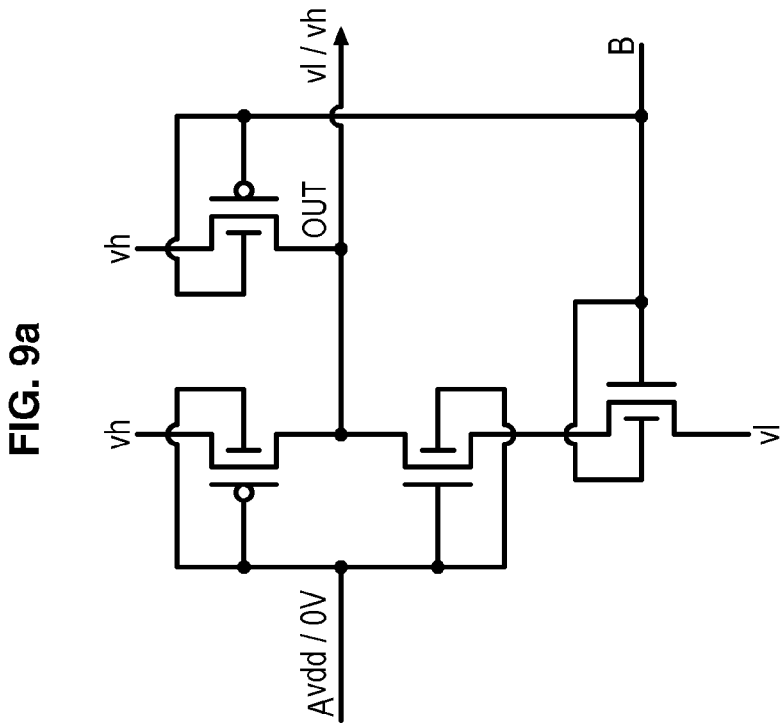
FIG. 9a
FIG. 9b

CHARGE PUMP CIRCUIT COMPRISING MULTIPLE—GATE TRANSISTORS AND METHOD OF OPERATING THE SAME

CROSS-REFERENCE TO RELATED APPLICATIONS

This application is a national phase entry under 35 U.S.C. §371 of International Patent Application PCT/EP2013/056126, filed Mar. 22, 2013, designating the United States of America and published in English as International Patent Publication WO 2013/139976 A1 on Sep. 26, 2013, which claims the benefit under Article 8 of the Patent Cooperation Treaty and under 35 U.S.C. §119(e) to French Patent Application Serial No. 1252640, filed Mar. 23, 2012, the disclosure of each of which is hereby incorporated herein in its entirety by this reference.

TECHNICAL FIELD

The invention relates to charge pump circuits for boosting voltages in microelectronic circuitry, and particularly to a charge pump circuit with body effect minimization and improved efficiency.

BACKGROUND

A charge pump circuit is generally used within an integrated semiconductor circuit for raising a voltage level of a power supply voltage supplied from an external circuit of the integrated semiconductor circuit and thus to obtain a required high voltage.

For instance, non-volatile memory arrays such as flash memory arrays require high positive or negative voltages to program and erase memory cells of the array. Typically, these voltages are higher than the supply voltage Vdd. Charge pumps are, therefore, used to boost on-chip voltages above the supply voltage Vdd to reach the voltages required for programming or erasing.

A charge pump circuit typically comprises cascaded stages that each pumps charges stored in a capacitor and, therefore, progressively raises the voltage levels of the intermediate nodes between the stages. Although many different circuit architectures are possible, existing bulk charge pumps are all based on this same principle that capacitors push charges from one stage to the next. Examples of conventional charge pump circuits can, for instance, be found in U.S. Pat. No. 7,098,725.

However, the body effects of the transistors in each stage, as well as the parasitic capacitances in the capacitors, degrade the performance of the conventional charge pump circuits when the number of stages is increased. In other words, the actual output voltage of the conventional charge pump circuits is lower than the ideal value because of the induced body effects.

U.S. Patent Application Publication No. US 2011/0241767 A1 discloses a charge pump circuit making use of multiple gate transistors to achieve a high level of output voltage. However, continuous efforts are made in the field of the invention to further increase the charge transfer efficiency of a charge pump circuit. Continuous efforts are also made to improve speed, to lower power dissipation and to lower area consumption of such circuit.

BRIEF SUMMARY

The invention aims at further improving the known charge pump circuits, and proposes, according to its first aspect, a charge pump circuit comprising:

an input node for inputting a voltage to be boosted;
an output node for outputting a boosted voltage;
a plurality of pumping stages connected in series between the input node and the output node, each pumping stage comprising at least one charge transfer transistor, wherein the at least one charge transfer transistor is a double-gate transistor comprising a first gate for turning the transistor on or off according to a first control signal applied to the first gate and a second gate for modifying the threshold voltage of the transistor according to a second control signal ($\phi_{1ctl}$, $\phi_{2ctl}$) applied to the second gate, wherein the first and second control signals have the same phase,
characterized in that the voltage level of the second control signal applied to the second gate of the at least one transfer transistor of a pumping stage is raised from one pumping stage to the next pumping stage in the series of pumping stages.

Other preferred, although non-limitative, aspects of this circuit are as follows:

each pumping stage comprises a stage input node and a stage output node, and the voltage level of the second control signal applied to the second gate of the at least one charge transfer transistor of a pumping stage is one of:
the voltage level of the stage input node of the pumping stage or of one of the following pumping stages in the series of pumping stages; and of
the voltage level of the stage output node of the pumping stage or, respectively, of the following pumping stage in the series of pumping stages;
it comprises at least one voltage level shifter circuit for providing the second control signal applied to the second gate of the at least one charge transfer transistor of each pumping stage, the voltage level shifter circuit comprising a plurality of Boolean logic gates connected in series, each Boolean logic gate being associated to one of the pumping stages and delivering the second control signal to be applied to the second gate of the at least one charge transfer transistor of the associated pumping stage;
the second gate of the at least one charge transfer transistor of a pumping stage is connected to an intermediate node of the pumping stage or of one of the following pumping stages in the series of pumping stages.

BRIEF DESCRIPTION OF THE DRAWINGS

Other aspects, goals and advantages of the invention will become more apparent upon reading the following detailed description of preferred embodiments thereof, given by way of examples and with reference to the accompanying drawings upon which:

FIGS. 9a and 9b, respectively, show a NAND gate and a NOR gate with Finfets that can be used to raise output voltage;

DETAILED DESCRIPTION

Figure 1:
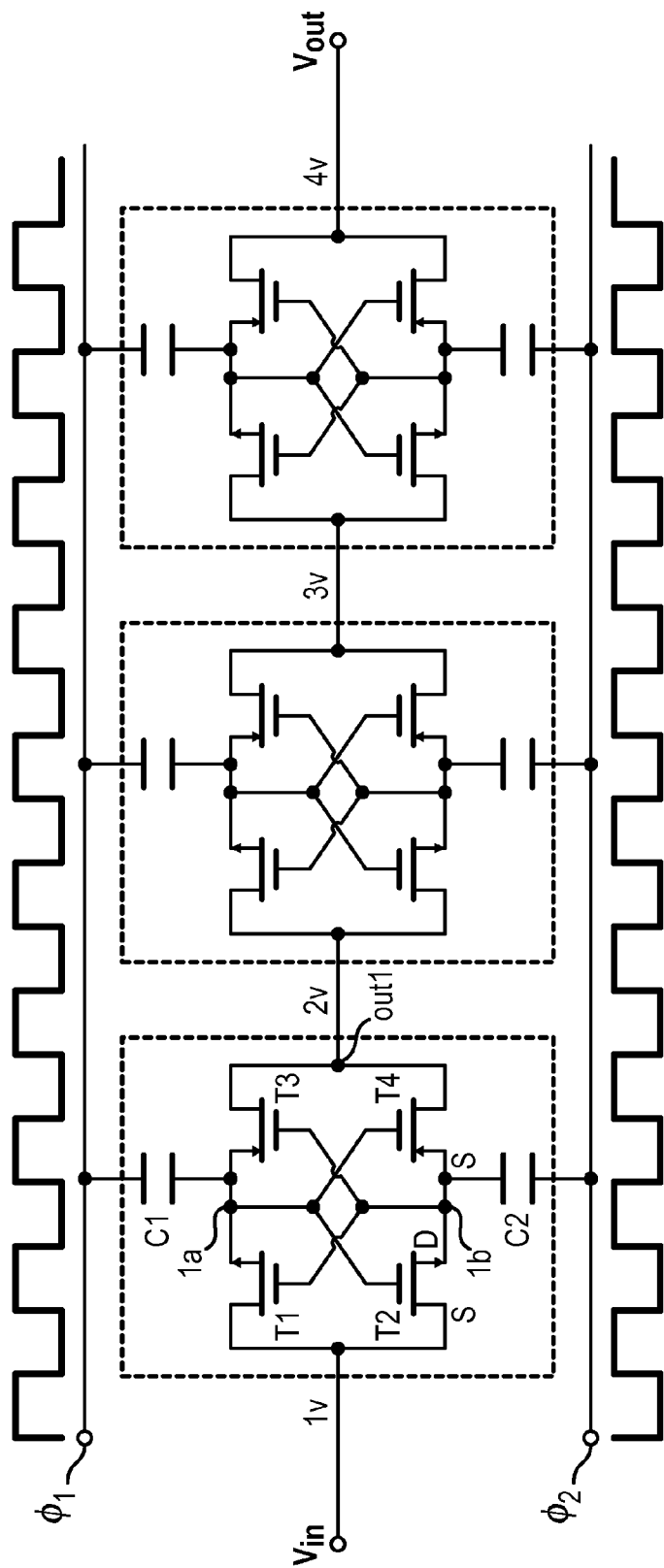
FIG. 1 shows a conventional bulk charge pump circuit.

FIG. 1 shows a three-stage conventional bulk charge pump circuit. With reference to the first stage, each stage comprises a first pumping capacitor C1, a second pumping capacitor C2 and a pair of cross-coupled inverters comprising a first inverter composed of an NMOS transistor T1 and a PMOS transistor T3 and a second inverter composed of an NMOS transistor T2 and a PMOS transistor T4.

A first terminal of the first pumping capacitor C1 receives a clock signal $\phi_1$, typically a square-shaped signal, and the other terminal is connected to a first intermediate node 1a. Likewise, a first terminal of the second pumping capacitor C2 receives a clock bar signal $\phi_2$, complementary to the clock signal $\phi_1$, and the other terminal is connected to a second intermediate node 1b.

A gate of the NMOS transistor T1, a drain of the NMOS transistor T2, a gate of the NMOS transistor T3 and a source of the NMOS transistor T4 are connected to the second intermediate node 1b. Likewise, a gate of the NMOS transistor T4, a source of the NMOS transistor T3, a drain of the NMOS transistor T1 and a gate of the NMOS transistor T2 are connected to the first intermediate node 1b. The NMOS transistors T1, T2 can be operated so as to transfer a power supply voltage $V_{in}$ from an input node to the first intermediate node 1a and the second intermediate node 1b. The PMOS transistors T3, T4 can be operated to transfer voltage loaded on the first intermediate node 1a and the second intermediate node 1b to an output node out1 intercalated between the first and second stages of the pump circuit.

The other stages operate the same way as the first stage. Hence, from a power supply voltage $V_{in}$, the pump circuit generates an output voltage $V_{out}=V_{in}+n\cdot VDD$ where n corresponds to the number of stages and VDD corresponds to the amplitude of the clock signals. In reality, as the pumping capacitors have junction parasitics below them in such a bulk circuit, the charge transfer efficiency of a stage is only around 90%. The capacitors C1, C2 are further relatively large with typical values around 5 pF.

The invention proposes to improve conventional pump circuits by replacing the CMOS bulk transistors by transistors having double independent gates, and by controlling the two gates through two signals on the same phase. If a first gate is used as a "normal" control gate to turn a transistor on and off while the voltage applied to the second gate is varied, it is possible to tune the transistor performance and to change its threshold voltage accordingly. Considering an N-channel transistor, thanks to the two synchronized gates, the off state of the transistor is improved as a low state on the second gate results in an increase of the threshold voltage so that the transistor is properly switched off with less leakage. Similarly, the on state of the transistor is also improved, as a high state on the second gate results in a decrease of the threshold voltage (which can even get negative, the transistor thereby working in depletion mode that allows for full and faster charge transfer) so that better and faster charge transfer is achieved across the transistor. Note that the high/low concept is fine for N-channel transistors, but inverted for P-channel transistors.

Each double-gate transistor can be a double-gate transistor having a back control gate under the buried insulating layer of an SeOI substrate (Semiconductor On Insulator). The back control gate preferentially serves as the second control gate for threshold voltage modification.

Each double gate transistor can also be a Fin-type independent double-gate transistor.

Hence, it will be appreciated that the invention can be implemented on the following technologies: PDSOI (Partially Depleted Silicon On Insulator), FDSOI (Fully Depleted Silicon On Insulator), as well as with FinFETs and other types of independent double-gate transistors. FDSOI proves advantageous in that it enhances the advantages as it allows smaller area per functionality than bulk.

The double-gate technology further proves advantageous as it reduces parasitic capacitances around the pumping capacitors (for instance, the parasitic capacitance in SeOI technology is ten to one hundred times smaller than the well junction parasitic capacitance observed in bulk technology). The conjunction of better transistors and of capacitors having less parasitics leads to capacitors being about ten times smaller, and the charge transfer efficiency is, therefore, greatly improved. As the area of the pump circuit is dominated by the capacitors, the function can be implemented on an area eight to ten times smaller.

It will be appreciated that the invention is in no manner limited to a particular pump charge circuit architecture, but extends, on the contrary, to any known architecture where conventional bulk transistors are replaced by transistors having double independent gates, and where the two gates are controlled through two signals on the same phase. Hence, it will be appreciated that the invention relates to a charge pump circuit comprising:

an input node for inputting a voltage to be boosted;
an output node for outputting a boosted voltage;
a plurality of pumping stages connected in series between the input node and the output node, each pump stage comprising at least one charge transfer transistor, wherein the at least one charge transfer transistor is a multiple-gate transistor comprising a first gate for turning the transistor on or off according to a first control signal applied to the first gate and a second gate for modifying the threshold voltage of the transistor according to a second control signal applied to the second gate, wherein the first and second control signals have the same phase.

Figure 2:
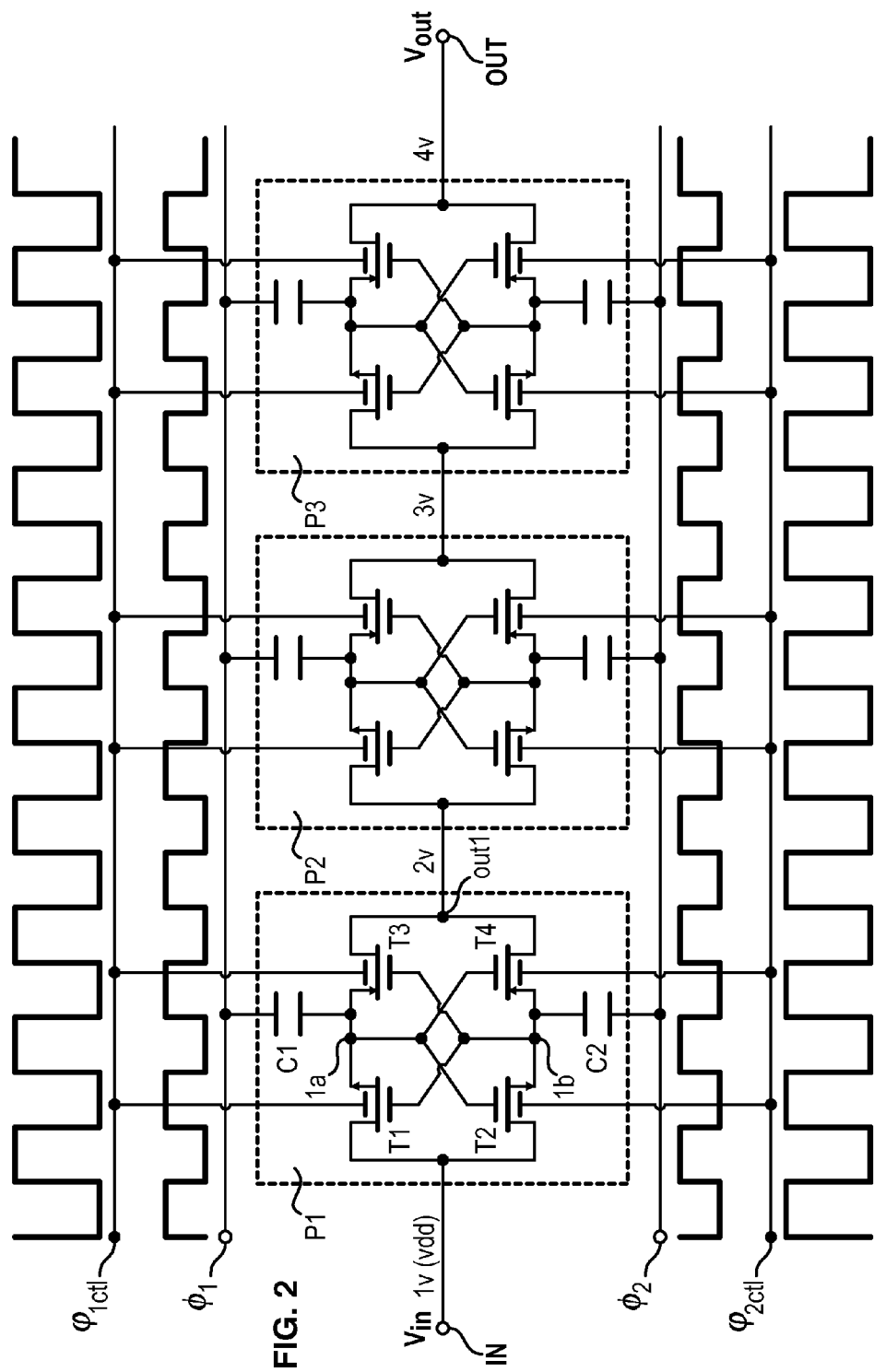
FIG. 2 shows a possible embodiment of an FDSOI (Fully Depleted Silicon On Insulator) charge pump circuit.

FIG. 2 shows a possible embodiment of an FDSOI charge pump circuit using the same architecture as the one of FIG. 1. The voltage to be boosted $V_{in}$ is inputted at input node IN, which corresponds to the input of the first pumping stage P1. The boosted voltage $V_{out}$ is outputted at output node OUT, which corresponds to the output of the last pumping stage P3. The circuit of FIG. 2 has three pumping stages P1-P3, but it will be appreciated that the number of stages is to be modified according to the needs.

The circuit of FIG. 2 differs from the one of FIG. 1 in that the transistors T1-T4 of each pumping stage P1-P3 are double-gate transistors having a front control gate and a back gate in the base substrate under the buried insulating layer of an SeOI substrate. The voltage applied to the back gates of transistors T1, T3 is controlled by means of a first back gate control signal $\phi_{1ctl}$, which has the same phase as the control signal (clock bar signal $\phi_2$) applied to their front gates. Conversely, the voltage applied to the back gates of transistors T2, T4 is controlled by means of a second back gate control signal $\phi_{2ctl}$, which has the same phase as the control signal (clock signal $\phi_1$) applied to their front gates.

The circuit of FIG. 2 operates as follows.

At instant "a," clock signal $\phi_1$ rises, thereby raising the first intermediate node 1a and turning off P-channel transistor T4. Clock bar signal $\phi_2$ falls, so that the second intermediate node 1b falls and P-channel transistor T3 is turned on. As a consequence, the charges (voltage) stored in the first capacitor C1 are pumped and transferred from C1 to the output out1 of the first pumping stage P1. N-channel transistor T1 is turned off, while N-channel transistor T2 is turned on so that the second intermediate node 1b collects charges from power supply voltage $V_{in}$ to second capacitor C2 and thereby returns to $V_{in}$.

At instant "b," clock signal $\phi_1$ falls, so that the first intermediate node 1a falls and P-channel transistor T4 is turned on and transfers the charge stored in the second capacitor C2 are pumped and transferred from C2 to the output out1 of the first pumping stage P1, which is, therefore, raised to $V_{in}$+VDD. Clock bar signal $\phi_2$ rises, thereby raising the second intermediate node 1b and turning off P-channel transistor T3. N-channel transistor T2 is turned off, while N-channel transistor T1 is turned on so that the first intermediate node 1a collects charges from $V_{in}$ to C1 and thereby returns to $V_{in}$.

At instant "c," clock signal $\phi_1$ rises, thereby raising the first intermediate node 1a to $V_{in}$+VDD and turning off P-channel transistor T4. Clock bar signal $\phi_2$ falls, so that the second intermediate node 1b falls and P-channel transistor T3 is turned on. As a consequence, the charges (voltage) stored in the first capacitor C1 are pumped and transferred from C1 to the output out1 of the first pumping stage P1. N-channel transistor T1 is turned off, while N-channel transistor T2 is turned on so that the second intermediate node 1b collects charges from $V_{in}$ to C2 and thereby returns to $V_{in}$.

The process is accumulative and the voltage at out1 reaches a maximum value of $V_{in}$+VDD. The following pumping stages P2-P3 operate the same way as the first stage P1 and each adds one VDD to the signal. Taking $V_{in}$=Vdd=1V, each stage adds 1V and the boosted output voltage $V_{out}$ reaches 4V. To avoid ripple at the last stage, a large load is needed. But, in general, such as with Flash arrays, the normal usage proves to be enough.

It will be appreciated that the voltages at the first and second intermediate nodes vary between the voltage level of the input node ($V_{in}$ in the case of the first pumping stage) and the voltage level at the output node ($V_{in}$+VDD in the case of the first pumping stage).

Figure 3:
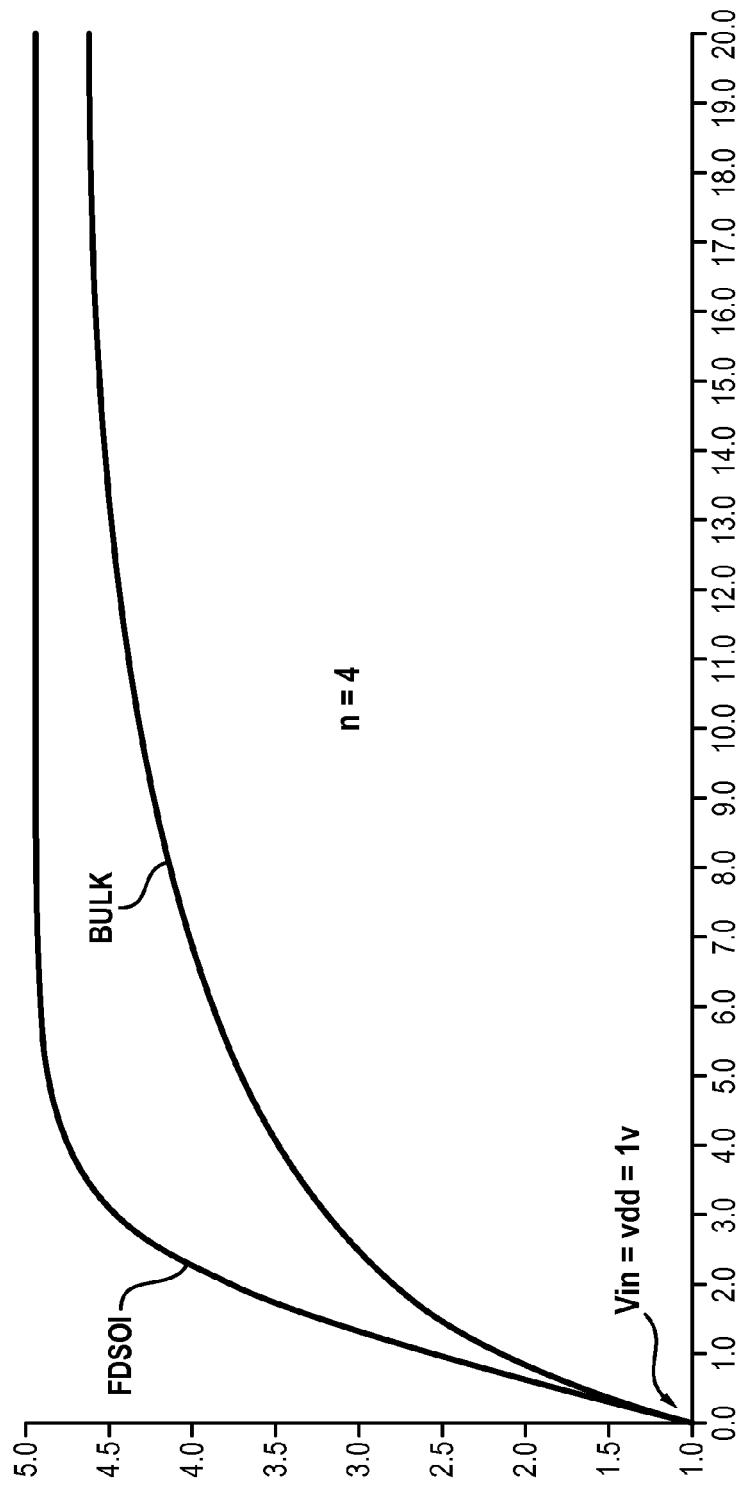
FIGS. 3, 4 and 5 are simulation results comparing the performances of the circuits of FIGS. 1 and 2.
Figure 4:
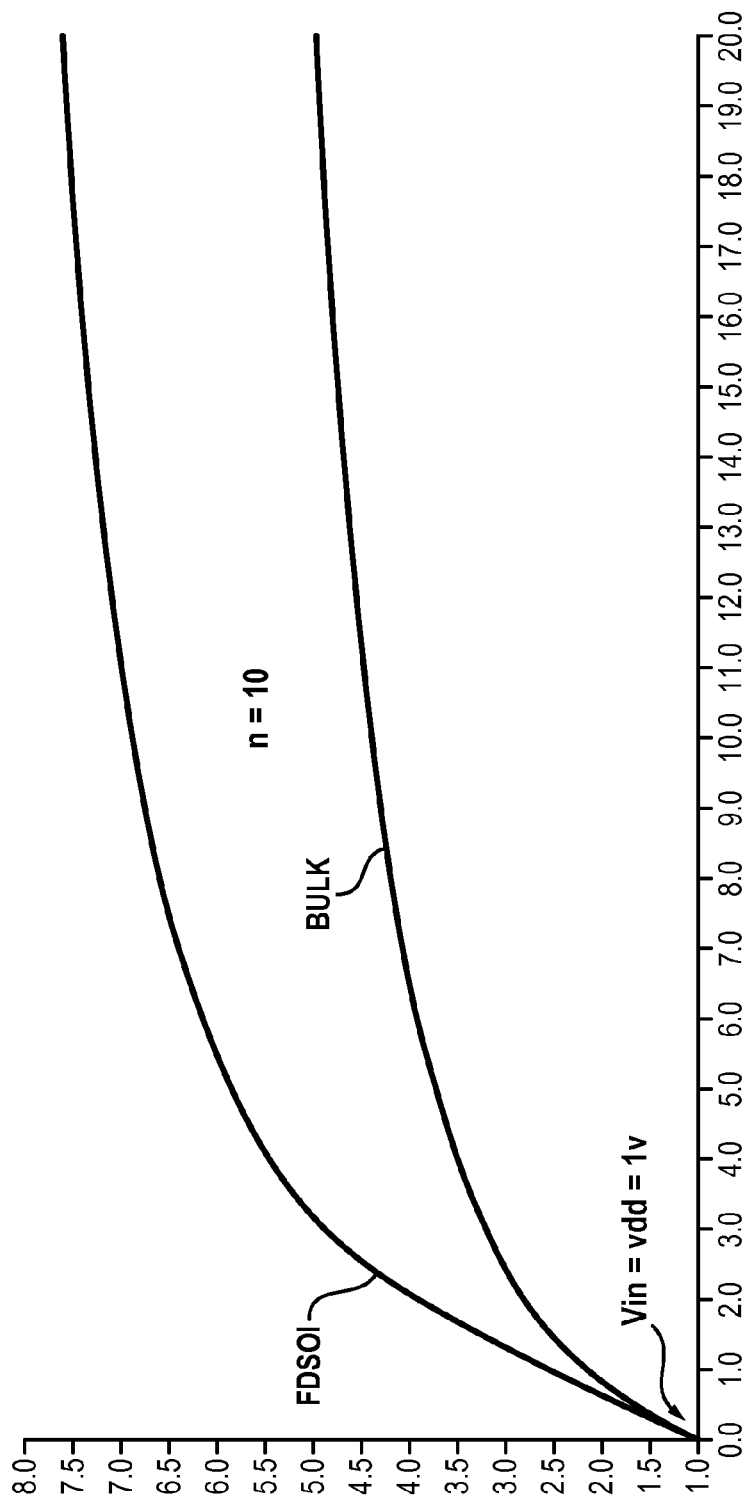
Figure 5:
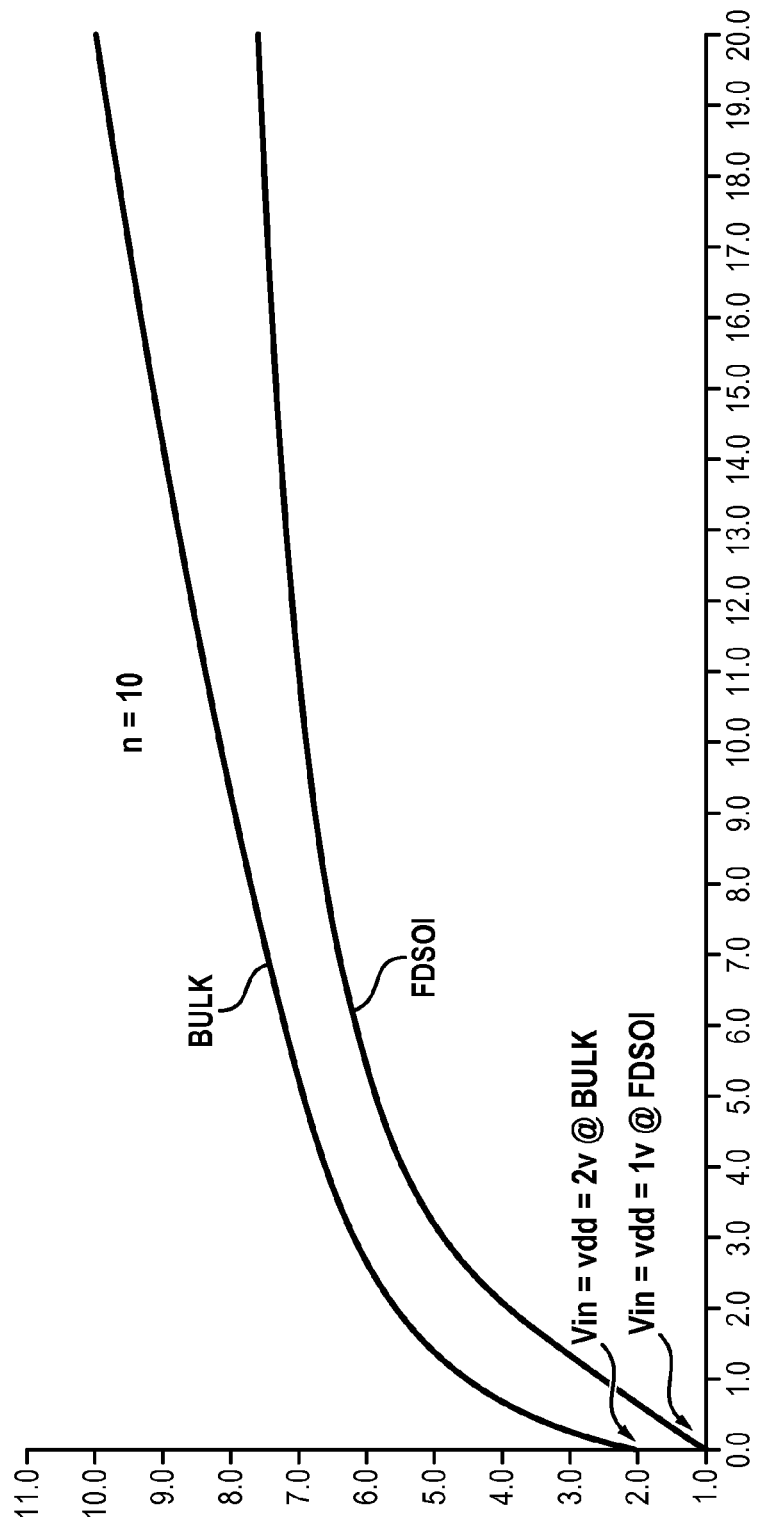

FIGS. 3, 4 and 5 are simulation results comparing the performances (Vout as a function of time) of the FDSOI charge pump circuit of FIG. 2 ("FDSOI") and of its bulk counterpart ("BULK").

FIG. 3 shows such a comparison for a four-pumping-stage circuit, which should, in theory, provide a boosted output voltage of 5V with Vin=Vdd=1V. The output boosted voltage only reaches around 4.6 VDD with the bulk circuit, while it reaches around 4.95 VDD with the FDSOI circuit of FIG. 2. The FDSOI circuit also proves to be much faster, while at the same time being eight to nine times smaller due to the difference in capacitance sizes.

FIG. 4 shows another comparison for a ten-pumping-stage circuit, which should, in theory, provide a boosted output voltage of 11V with Vin=Vdd=1V. For times longer than 20 µs, the output boosted voltage only reaches around 5.5 to 6 VDD with the bulk circuit, while it reaches around 8 to 9 VDD with the FDSOI circuit of FIG. 2. The FDSOI circuit still proves to be much faster, while at the same time being 8-9 times smaller. In addition, it has to be noted that the FDSOI pump can provide high output voltages, while the bulk pump cannot.

FIG. 5 shows that bulk pumps needs a higher power supply Vin to provide a high boosted voltage Vout of around 10V. With Vin=Vdd=2V, and all other parameters unchanged, the bulk circuit reaches around 14-15V (while it should attain 22V in theory). At the same time, with a power supply still of 1V, the FDSOI circuit of FIG. 2 reaches 8-9V (11V in theory).

It will, therefore, be appreciated that a circuit using double-gate transistors has the following advantages. Each transistor gets a better off-state with the second control gate, which reduces the leakages and, hence, power consumption. The on-state of the transistors is also improved thanks to the second control gate, which allows for faster and more efficient charge transfer. The pumping capacitors do not have junction parasitic below themselves (only very small parasitics through the buried insulating layer of an SeOI substrate), which allows for better pumping ratios with smaller absolute values for each capacitor. In addition, it allows for lower input voltage Vin and higher pumped VDD values. Single low power supplies are, therefore, possible. It will be noted that these properties are even better with independent gated finfets, the two gates of each transistor being controlled by the same control signal and, thus, with the same phase and same amplitude.

As shown in FIG. 4, charge transfer efficiency of a ten-stage FDSOI charge pump appears to saturate according to an asymptote around 8-9V, while it should reach 11V, in theory. And this gap, with theory, is to increase as the number of stages increases.

As shown in FIG. 2, the voltages applied to the sources and drains of the transistors get higher and higher from one stage to another. At stage number n, high and low power supplies of the pumping stage are nVDD and (n+1)VDD. But at the same time, the back control gates are still referenced to ground or VDD. It is thus understood that efficiency of the threshold voltage modification by means of the back gates lowers from one stage to another.

The invention, therefore, proposes to raise the voltage level applied to the second control gates (for instance, back gates) of the transistors of a pumping stage from one pumping stage to another in the series of pumping stages.

In an exemplary embodiment, the back gates of the transistors of a pumping stage are slaved to the pumping stage voltage. More precisely, the voltage levels applied to the back gates are either the low or the high power supplies of the associated pumping stage. In such manner, efficiency of the threshold voltage modification by means of the back gates remains constant, whatever the pumping stage.

The invention is not limited to this embodiment and provides, on the contrary, flexibility as to the choice of the voltage levels applied to the back gates. In particular, the voltage levels applied to the back gates of a pumping stage can be slaved to the voltage levels of one of the following pumping stages in the series of pumping stages, such as, for instance, the adjacent next pumping stage. This proves advantageous with SeOI double-gate transistors having a front control gate and a back control gate, and wherein the front gate oxide is thinner than the back gate oxide (the buried insulating layer) so that the voltage applied to the back gate should preferably be higher than the one applied to the front gate.

A first manner for raising the voltage level applied to the second control gates from one pumping stage to another is disclosed hereafter. The charge pump circuit comprises at least one voltage level shifter circuit for providing the second control signal applied to the second gate of the at least one charge transfer transistor of each pumping stage. The voltage level shifter circuit comprises a plurality of Boolean logic gates connected in series, each Boolean logic gate being associated to one of the pumping stage and delivering the second control signal to be applied to the second gate of the at least one charge transfer transistor of the associated pumping stage.

Each Boolean logic gate may, in particular, be arranged between a high power supply connected to the output node of the associated pumping stage (or to the output node of one of the following pumping stages in the series) and a low power supply connected to the input node of the associated pumping stage (or, respectively, to the input node of the following pumping stage in the series). As discussed below, each Boolean logic gate can be an inverter having transistors in series between such high and low power supplies.

FIGS. 6a, 6b, 7a, and 7b show inverters that are capable of raising output levels. The inverters comprise a P-channel transistor Tp and an N-channel transistor Tn in series between a high power supply 2 vdd and a low power supply vdd. The transistors Tp, Tn are preferably double-gate transistors.

Figure 6A:
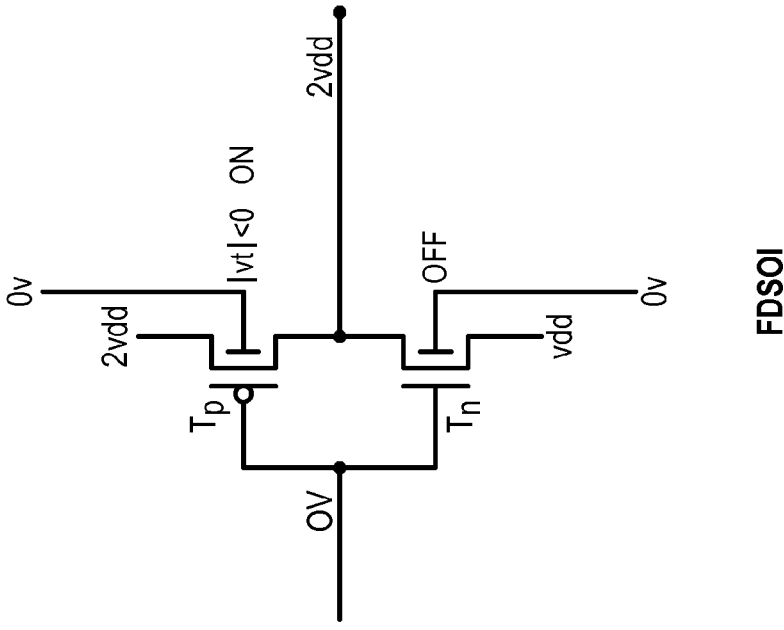
FIGS. 6a and 6b show an FDSOI inverter that raises output level.
Figure 6B:
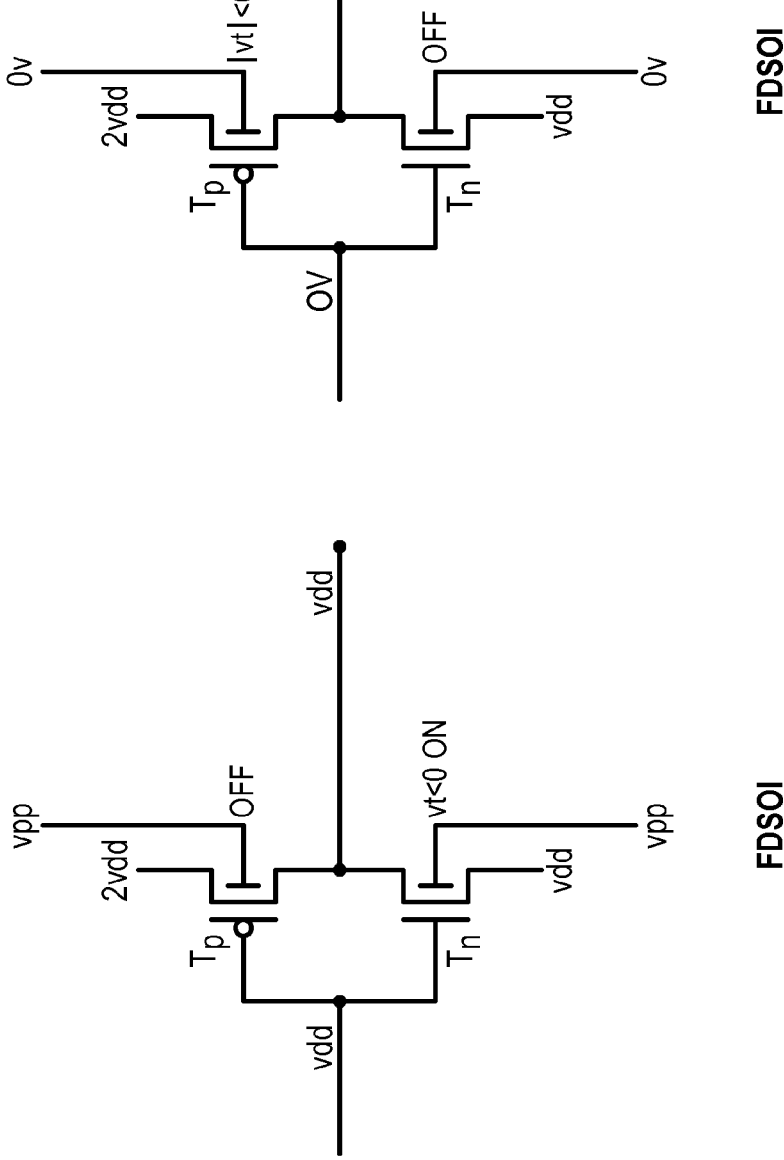

FIGS. 6a and 6b show an FDSOI inverter, which transistors are double-gate transistors, with a back gate under the buried insulating layer in addition to the conventional front gate. In FIG. 6, a positive input voltage Vdd is applied to the input node of the inverter, while a high voltage Vpp is also applied to the back gates of the transistors. P-channel transistor Tp is in the off state (as it exhibits a very high threshold voltage in absolute value due to the high voltage Vpp applied to its back gate, and as a high level Vdd is applied to its first gate). N-channel transistor Tn is turned to depletion (its threshold voltage VT is decreased to a negative value by means of the high voltage Vpp applied to its back gate) and thereby transfers charges from its source to the output of the inverter, i.e., Vdd (no body effect) or any chosen low power supply. In FIG. 6b, the input voltage and the back gate voltages are set to 0V. The P-channel transistor Tp is turned to depletion (|VT|<0) and transfers its source to output, i.e., 2 Vdd (no body effect) or any chosen high power supply. The N-channel transistor Tn is in the off state (very high VT and low level on its first gate gate). It will be appreciated that this inverter logic gate changes both high and low levels without any leakage or current path.

Figure 7A:
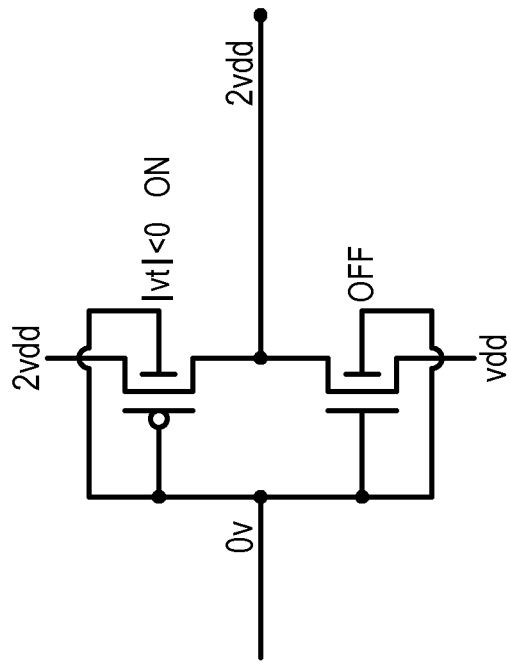
FIGS. 7a and 7b show a Finfet inverter that raises output level.
Figure 7B:
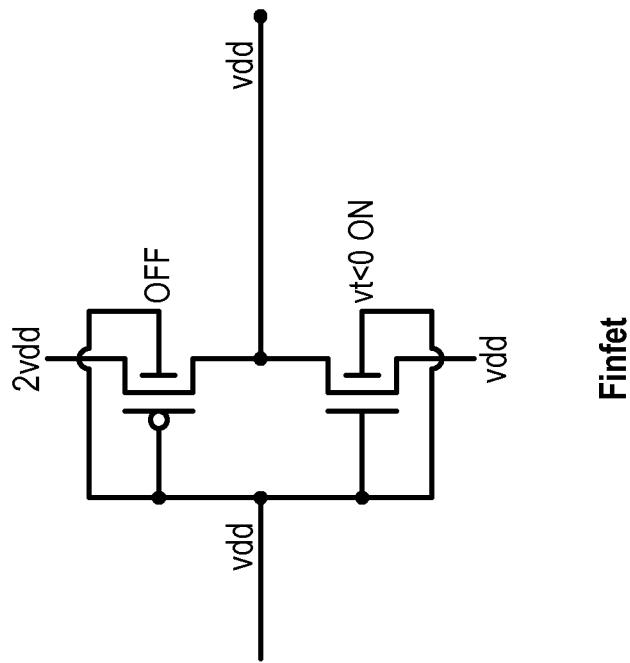

FIGS. 7a and 7b show an inverter with Finfet double-gate transistors. It works the same way as the one of FIGS. 6a and 6b, except that the Finfet version just needs Vdd on the second gates while the FDSOI version needs to apply a large voltage on Vpp.

Figure 8:
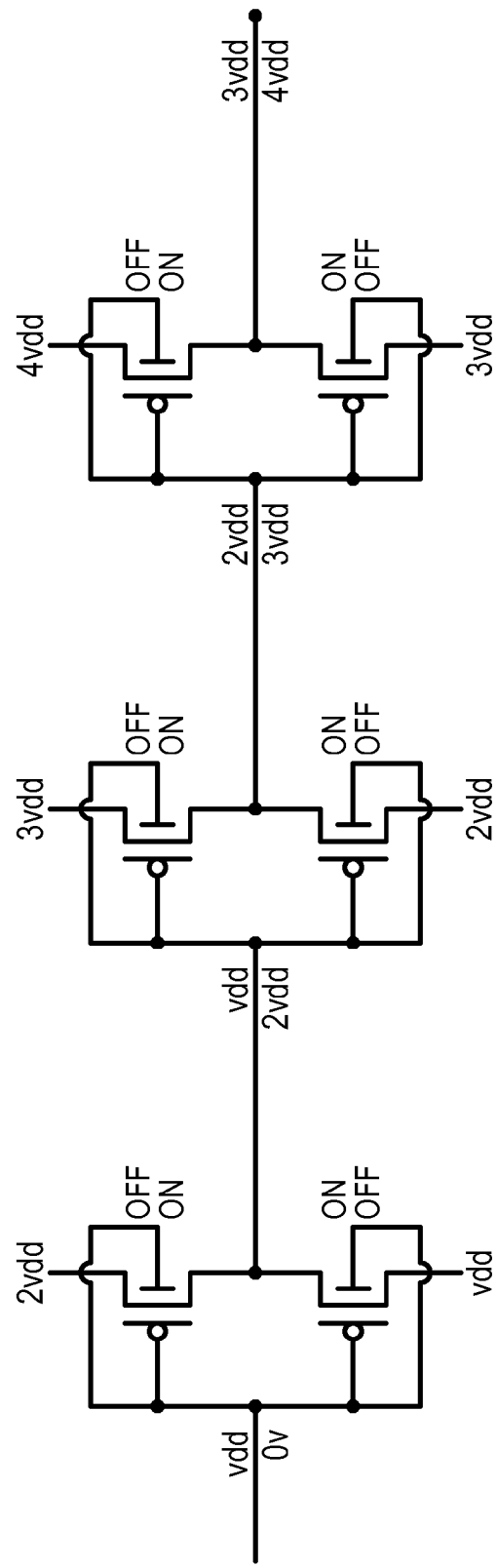
FIG. 8 shows a chain of Finfet inverters.

FIG. 8 shows a cascaded chain of Finfet inverters according to FIGS. 7a and 7b. It will be appreciated that the voltage rise effect of an inverter is thereby accumulated from one stage to the next, in particular, as FDSOI and Finfets do not use the substrate as an electrode. Hence, inverter number n in the chain outputs either low level voltage n·vdd or high level voltage (n+1)·vdd.

It will be appreciated that the principle here explained with respect to a chain of inverters can be extended to any chain of Boolean logic gates, such as NOR or NAND gates. In this respect, FIGS. 9a and 9b, respectively, show a NAND gate and a NOR gate with Finfets that can be used to raise output voltage according to the power supplied (low and high).

Figure 10:
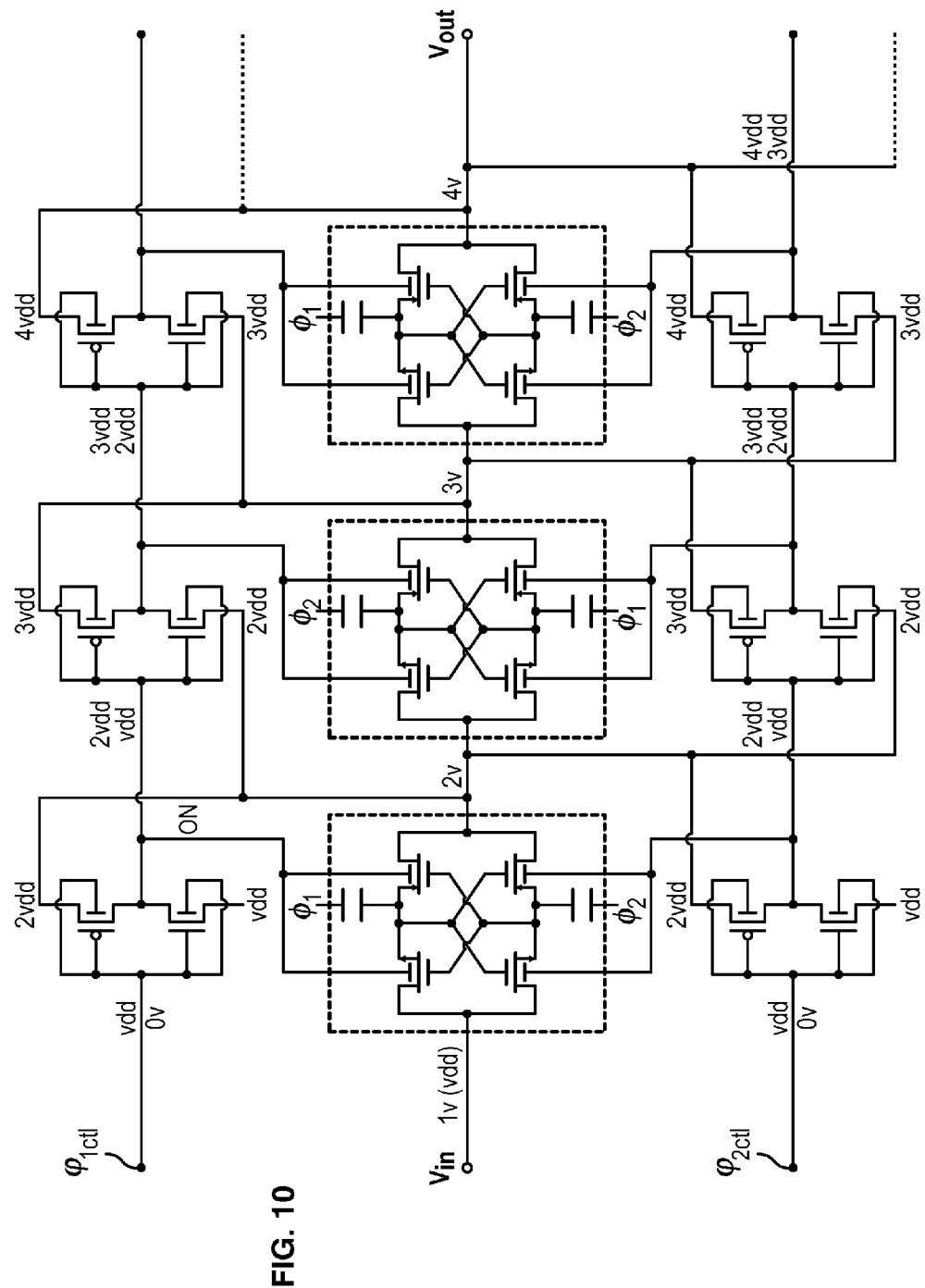
FIG. 10 shows a possible embodiment of a charge pump circuit according to the invention making use of the chain of Finfet inverters of FIG. 8.

FIG. 10 shows a charge pump circuit according to the invention making use of the chain of Finfet inverters of FIG. 8. Here, two voltage level shifter circuits are provided, one receiving first back gate control signal $\phi_{1ctl}$ at its input, while the other one receives the second back gate control signal $\phi_{2ctl}$. Each inverter in a voltage level shifter circuit is associated to a corresponding pumping stage and delivers control signals to be applied to the back gates of the charge transfer transistors of the pumping stage. Each inverter has transistors in series between a high power supply and a low power supply. It will be appreciated that the clock signals $\phi_1$ and $\phi_2$ alternate from one pumping stage to another so as to ensure that the two gates of the charge transfer transistors are in phase (but not necessarily with the same amplitude, as a higher amplitude may be preferred for the back gates as shown in FIG. 2).

The high power supply of each inverter can be connected to the output node of the associated pumping stage, while the low power supply can be connected to the input node of the associated pumping stage. In such way, the voltage level shifter circuits raise the levels applied to the back control gates according to the corresponding power supplies (high and low) of the corresponding pumping stage. The invention is not limited to this particular embodiment, and provides flexibility as to the choice of the voltage levels of the high and low power supplies of the inverters that, for instance, can be connected to input nodes or output nodes of pumping stages different from the associated pumping stage in the series of pumping stages and, in particular, to the input node and output node of one of the following pumping stages in the series of the pumping stages, such as, for instance, the adjacent next pumping stage.

The energy used by the voltage level shifter circuit (inverter chain, for instance) is a small portion of the energy generated by the pump. As the transistors on these inverters are very lowly charged (only two back gates in the example of FIG. 10) and do not need to be extremely fast, they can be very small and use only a very small percentage of the pump capacity.

It will be noted that the P-channel transistors of a voltage level shifter circuit must be high voltage transistors (thick gate oxide) as its Vgs can be as high as 2 Vdd. However, the limitation of using thick oxide P-channel transistors is not an issue in the case of pumps (low frequency and most of used area being the capacitors). In case of a technology not having these thick transistors, it is always possible to generate the inverter (or buffer) with a schematic comparable to the one described in U.S. Pat. No. 6,518,818. Such schematic can be easily remapped on FDSOIs or Finfets. In this case, all transistors will have Vdd or less between any of their three electrodes.

Figure 11:
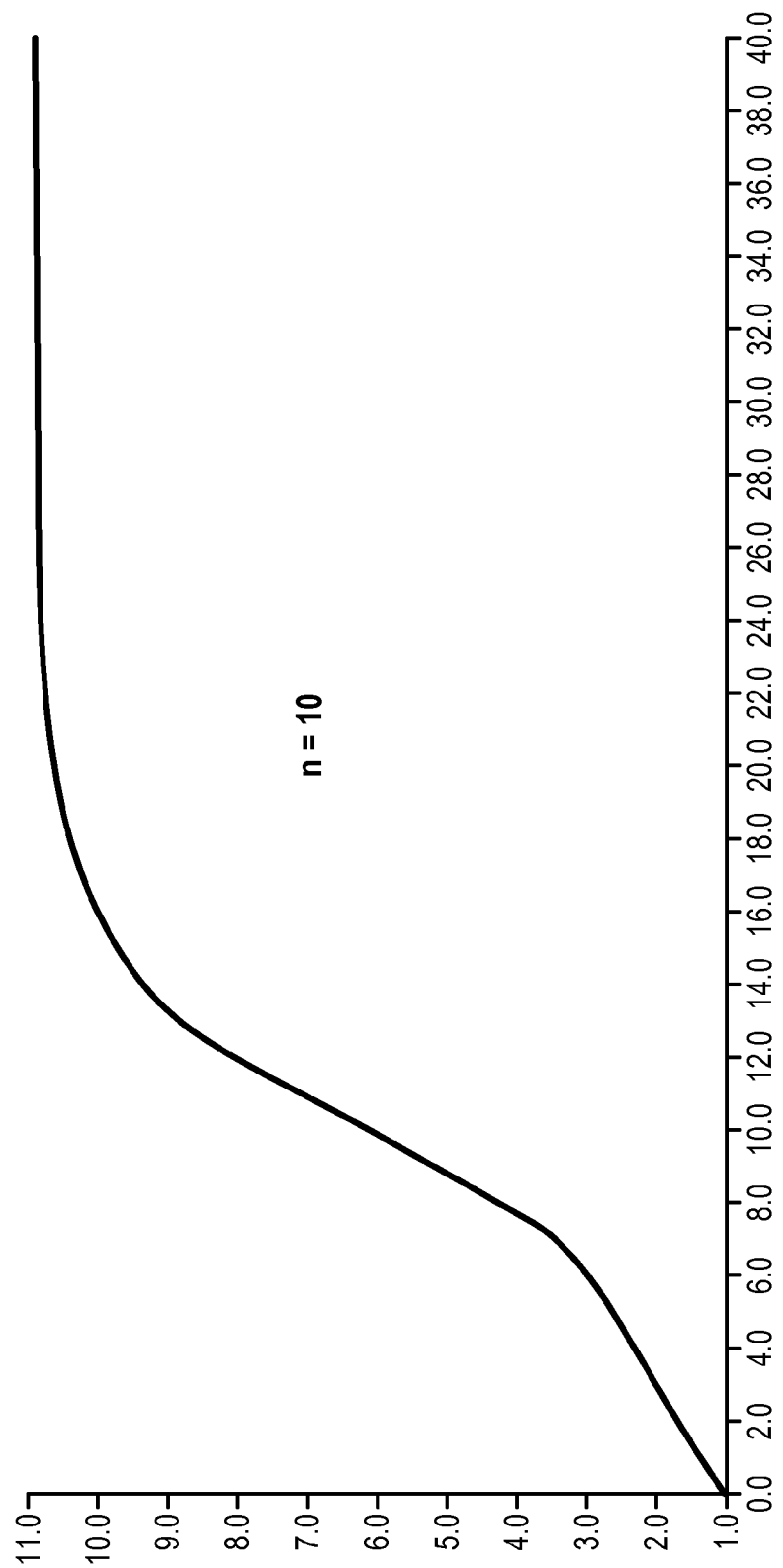
FIG. 11 shows simulation results of the performance of the charge pump circuit of FIG. 10.

FIG. 11 shows simulation results of the performance of the charge pump circuit of FIG. 10 having ten pumping stages, which should, in theory, provide a boosted output voltage of 11V with $V_{in}$=Vdd=1V. For times longer than 20 µs, the boosted output voltage reaches around 10.8V, close to the theory and far better than the asymptote around 8-9V reached by the circuit of FIG. 2 as shown in FIG. 4. The comparison of FIGS. 4 and 11 thereby illustrates that having the voltage applied to the back gates of the transistors of a pumping stage raised from one pumping stage to another, for instance, slaved to the pumping stage voltage, allows better performance.

According to a second manner of raising the voltage level applied to the second control gates from one pumping stage to another, the second gate of the at least one charge transfer transistor of a pumping stage is connected to an intermediate node of a pumping stage and, in particular, an intermediate node, which voltage level varies between one of the voltage levels of the input node of a pumping stage and of the voltage level at the output node of the pumping stage. It will be appreciated that this second manner proves advantageous in that there is no need for a dedicated circuit (such as the voltage level shifter circuit of FIG. 10 raising the voltage level) for raising the voltage level applied to the second control gates.

The intermediate node corresponds, for instance, to one of intermediate nodes having reference numerals 1a, 1b in FIG. 1 that is an intermediate node connected to a terminal of a capacitor, which other terminal is connected to a clock signal φ₁, φ₂.

Figure 12:
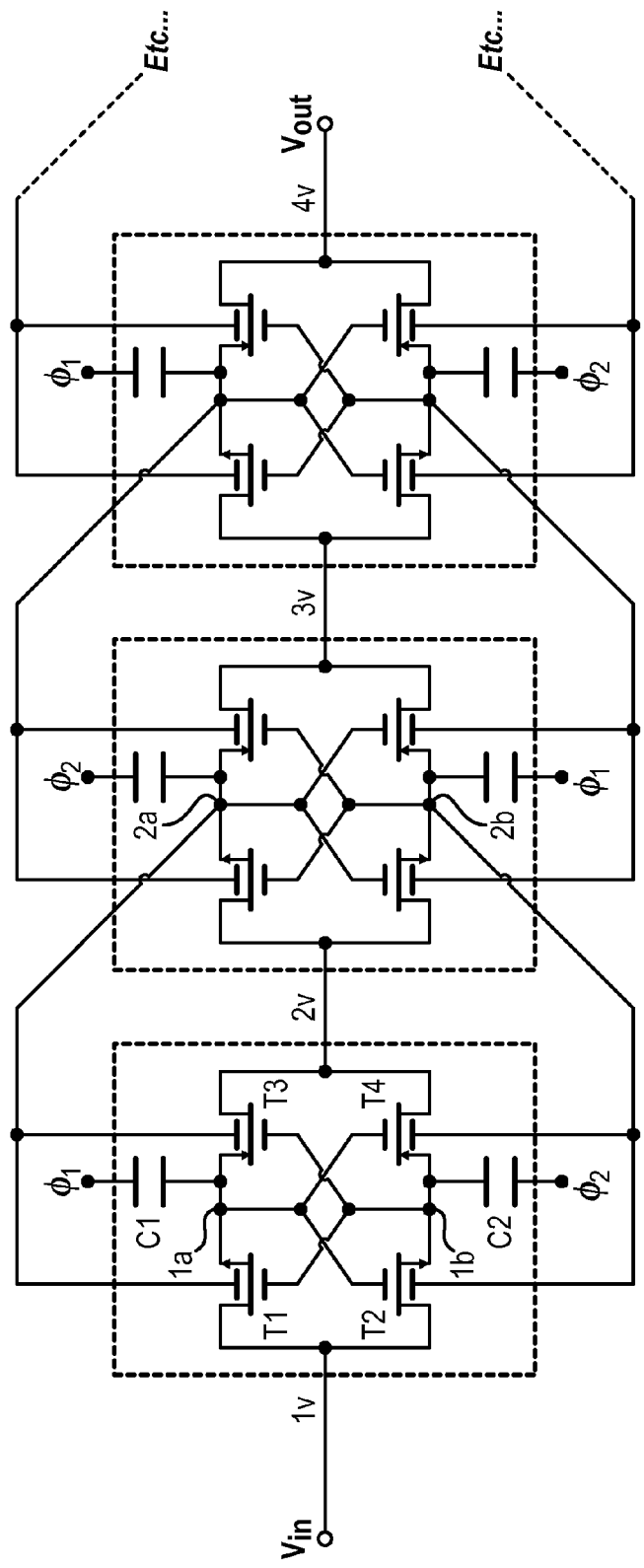
FIG. 12 shows another possible embodiment of a charge pump circuit according to the invention.

In particular, the second gate of the at least one charge transfer transistor of a pumping stage may be connected to an intermediate node of the adjacent next pumping stage in the series of pumping stages. As shown in FIG. 12, the voltage applied to the back gates of transistors T1, T3, respectively, of transistors T2, T4, of the first pumping stage is controlled by means of a first back gate control signal, which corresponds to the signal at the intermediate node 2a, respectively at the intermediate node 2b, of the second pumping stage and which voltage level is at $V_{in}$+VDD or at $V_{in}$+2*VDD. It will be appreciated that depending upon the needs, intermediate nodes of other pumping stages can be used, such as the intermediate nodes of the pumping stage to which the transistors pertain (this could be the case for the last pumping stage of the series for the pump circuit of FIG. 12).

It will be appreciated that in the pump circuit of FIG. 12, the clock signals φ₁ and φ₂ alternate from one pumping stage to another so as to ensure that the two gates of the charge transfer transistors are in phase.

Figure 13:
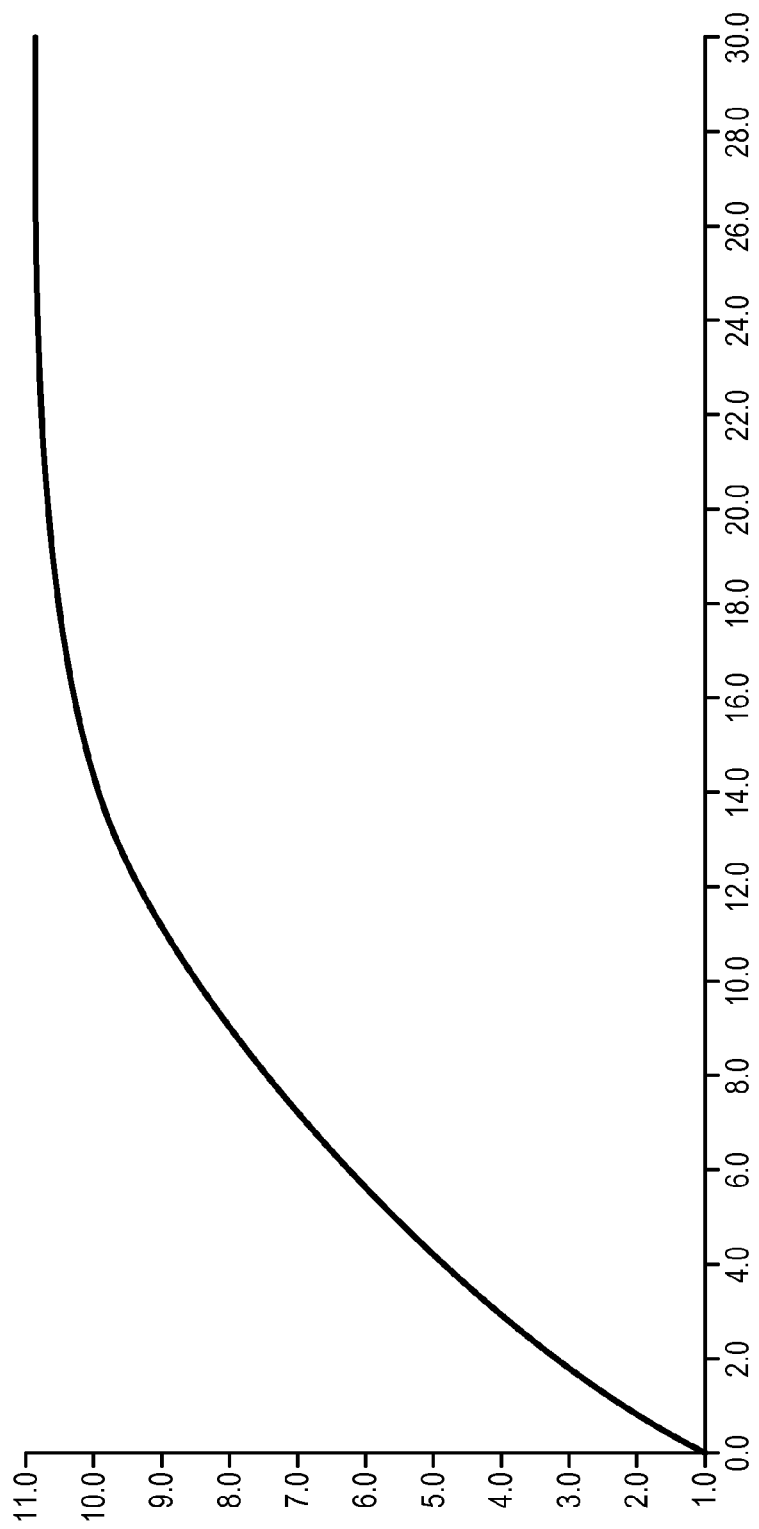
FIG. 13 shows simulation results of the performance of the charge pump circuit of FIG. 12.

FIG. 13 shows simulation results of the performance of the charge pump circuit of FIG. 12 having 10 pumping stages and that should, in theory, provide a boosted output voltage of 11V with $V_{in}$=Vdd=1V. For times longer than 20 μs, the boosted output voltage reaches around 10.8V, close to the theory and far better than the asymptote around 8-9V reached by the circuit of FIG. 2 as shown in FIG. 4. This charge pump circuit also proves faster than the one of FIG. 10 (after 10 μs, the boosted output voltage reaches around 8.5V, while it only reaches around 6V with the circuit of FIG. 10 as illustrated in FIG. 11).

Figure 14:
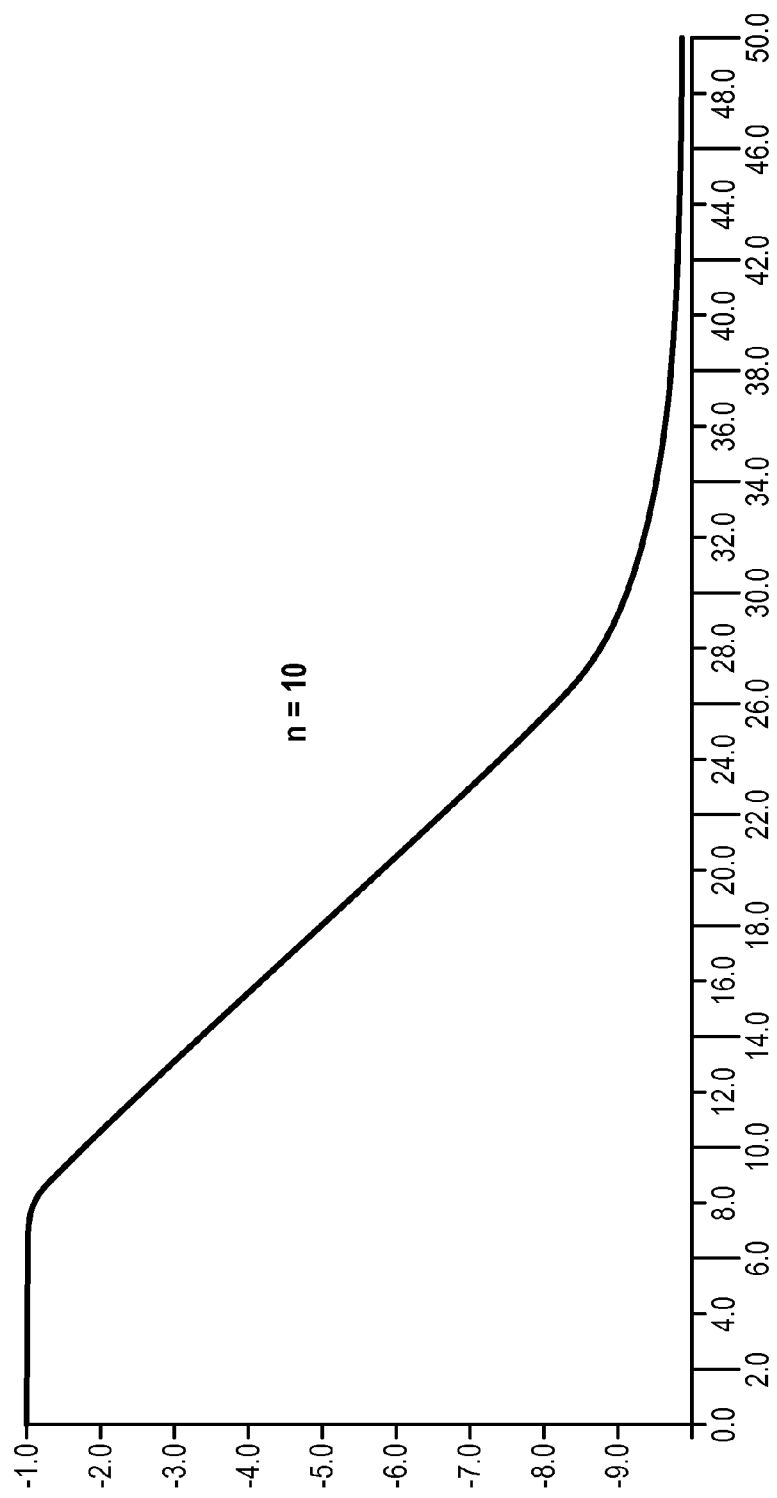
FIG. 14 shows simulation results of the performance of a charge pump circuit symmetrical to the one of FIG. 10.

In the foregoing, the charge pump circuit generates a positive boosted output voltage. It will be appreciated that the invention also extends to a charge pump circuit generating a negative boosted output voltage. Such negative charge pump circuit is merely the symmetrical counterpart circuit of the positive charge pump circuit (wherein all N transistors are replaced by P transistors and vice-versa, high power supply VDD is replaced by low power supply GND and vice-versa, etc.). In this respect, FIG. 14 shows simulation results of the performance of the negative counterpart circuit of the charge pump circuit of FIG. 10 (with ten pumping stages). Starting from an input voltage $V_{in}$=0V, the boosted negative output voltage reaches -9.8V, close to theory (-10V). It will be appreciated that the flat starting portion of the curve of FIG. 14 is due to artificial initial conditions needed to run the simulation.

It will also be noted that the invention is not limited to the charge pump circuit according to its first aspect, but also extends to the method of operating such a charge pump circuit as detailed above and, in particular, to such a method that comprises:

applying an input voltage to be boosted to the input node of the charge pump circuit, applying a first control signal to the first gate of the at least one charge transfer transistor of each pumping stage, applying a second control signal to the second gate of the at least one charge transfer transistor of each pumping stage, the second control signal being in phase with the first control signal;

raising the voltage level of the second control signal applied to the second gate of the at least one transfer transistor of a pumping stage from one pumping stage to the next pumping stage in the series of pumping stages.

The invention claimed is:

1. A charge pump circuit comprising:
an input node for inputting a voltage ($V_{in}$) to be boosted;
an output node for outputting a boosted voltage ($V_{out}$); and
a plurality of pumping stages connected in series between the input node and the output node, each pump stage comprising at least one charge transfer transistor, wherein the at least one charge transfer transistor is a double-gate transistor comprising a first gate for turning the transistor on or off according to a first control signal applied to the first gate and a second gate for modifying the threshold voltage of the transistor according to a second control signal applied to the second gate, wherein the first and second control signals have the same phase,
wherein a voltage level of the second control signal applied to the second gate of the at least one transfer transistor of a pumping stage is raised from one pumping stage to the next pumping stage in the series of pumping stages.

2. The charge pump circuit of claim 1, wherein each pumping stage comprises a stage input node and a stage output node, and wherein the voltage level of the second control signal applied to the second gate of the at least one charge transfer transistor of a pumping stage is one of:
the voltage level of the stage input node of the pumping stage or of one of the following pumping stages in the series of pumping stages; and
the voltage level of the stage output node of the pumping stage or, respectively, of the following pumping stage in the series of pumping stages.

3. The charge pump circuit of claim 1, further comprising at least one voltage level shifter circuit for providing the second control signal applied to the second gate of the at least one charge transfer transistor of each pumping stage, the voltage level shifter circuit comprising a plurality of Boolean logic gates connected in series, each Boolean logic gate being associated to one of the pumping stages and delivering the second control signal to be applied to the second gate of the at least one charge transfer transistor of the associated pumping stage.

4. The charge pump circuit of claim 3, wherein each Boolean logic gate is arranged between:
a high power supply connected to the output node of the associated pumping stage or of one of the following pumping stages in the series of pumping stages; and
a low power supply connected to the input node of the associated pumping stage or, respectively, of the following pumping stage in the series of pumping stages.

5. The charge pump circuit of claim 4, wherein each Boolean logic gate is an inverter.

6. The charge pump circuit of claim 3, wherein the voltage level shifter circuit comprises double-gate transistors.

7. The charge pump circuit of claim 1, wherein the second gate of the at least one charge transfer transistor of a pumping stage is connected to an intermediate node of a pumping stage.

8. The charge pump circuit of claim 7, wherein each pumping stage comprises at least one capacitor having a first terminal to which is applied a clock signal and a second terminal connected to the intermediate node.

9. The charge pump circuit of claim 7, wherein the second gate of the at least one charge transfer transistor of a pumping stage is connected to an intermediate node of the pumping stage or of one of the following pumping stages in the series of pumping stages.

10. A method of operating a charge pump circuit, comprising:
   providing a charge pump circuit including:
      an input node for inputting a voltage to be boosted;
      an output node for outputting a boosted voltage; and
      a plurality of pumping stages connected in series between the input node and the output node, each pump stage comprising at least one charge transfer transistor, wherein the at least one charge transfer transistor is a double-gate transistor comprising a first gate for turning the transistor on or off according to a first control signal applied to the first gate and a second gate for modifying the threshold voltage of the transistor according to a second control signal applied to the second gate;
   applying an input voltage to be boosted to the input node;
   applying a first control signal to the first gate of the at least one charge transfer transistor of each pumping stage;
   applying a second control signal to the second gate of the at least one charge transfer transistor of each pumping stage, the second control signal being in phase with the first control signal; and
   raising the voltage level of the second control signal applied to the second gate of the at least one transfer transistor of a pumping stage from one pumping stage to the next pumping stage in the series of pumping stages.

11. The charge pump circuit of claim 2, further comprising at least one voltage level shifter circuit for providing the second control signal applied to the second gate of the at least one charge transfer transistor of each pumping stage, the voltage level shifter circuit comprising a plurality of Boolean logic gates connected in series, each Boolean logic gate being associated to one of the pumping stages and delivering the second control signal to be applied to the second gate of the at least one charge transfer transistor of the associated pumping stage.

12. The charge pump circuit of claim 4, wherein the voltage level shifter circuit comprises double-gate transistors.

13. The charge pump circuit of claim 5, wherein the voltage level shifter circuit comprises double-gate transistors.

14. The charge pump circuit of claim 2, wherein the second gate of the at least one charge transfer transistor of a pumping stage is connected to an intermediate node of a pumping stage.

15. The charge pump circuit of claim 8, wherein the second gate of the at least one charge transfer transistor of a pumping stage is connected to an intermediate node of the pumping stage or of one of the following pumping stages in the series of pumping stages.

16. The method of claim 10, further comprising selecting a charge voltage level of the second control signal applied to the second gate of the at least one charge transfer transistor of a pumping stage to be one of:
   the voltage level of the stage input node of the pumping stage or of one of the following pumping stages in the series of pumping stages; and
   the voltage level of the stage output node of the pumping stage or, respectively, of the following pumping stage in the series of pumping stages.

* * * * *

UNITED STATES PATENT AND TRADEMARK OFFICE
CERTIFICATE OF CORRECTION

PATENT NO. : 9,225,237 B2
APPLICATION NO. : 14/384129
DATED : December 29, 2015
INVENTOR(S) : Richard Ferrant Page 1 of 1

It is certified that error appears in the above-identified patent and that said Letters Patent is hereby corrected as shown below:

In the specification:

| | | |
|---|---|---|
| COLUMN 2, | LINE 11, | change "signal ($\phi_{1ctl}$, $\phi_{2ctl}$)" to --signal ($\varphi_{1ctl}$, $\varphi_{2ctl}$)-- |
| COLUMN 4, | LINE 66, | change "control signal $\phi_{1ctl}$," to --control signal $\varphi_{1ctl}$,-- |
| COLUMN 5, | LINE 3, | change "$\phi_{2ctl}$," to --$\varphi_{2ctl}$,-- |
| COLUMN 7, | LINE 65, | change "signal $\phi_{1ctl}$" to --signal $\varphi_{1ctl}$-- |
| COLUMN 7, | LINE 67, | change "$\phi_{1ctl}$." to --$\varphi_{1ctl}$.-- |

Signed and Sealed this
Twelfth Day of July, 2016

Michelle K. Lee
*Director of the United States Patent and Trademark Office*